No. 638,562. Patented Dec. 5, 1899.
J. S. COPELAND.
GEAR CUTTING MACHINE.
(Application filed Apr. 12, 1899.)
(No Model.)
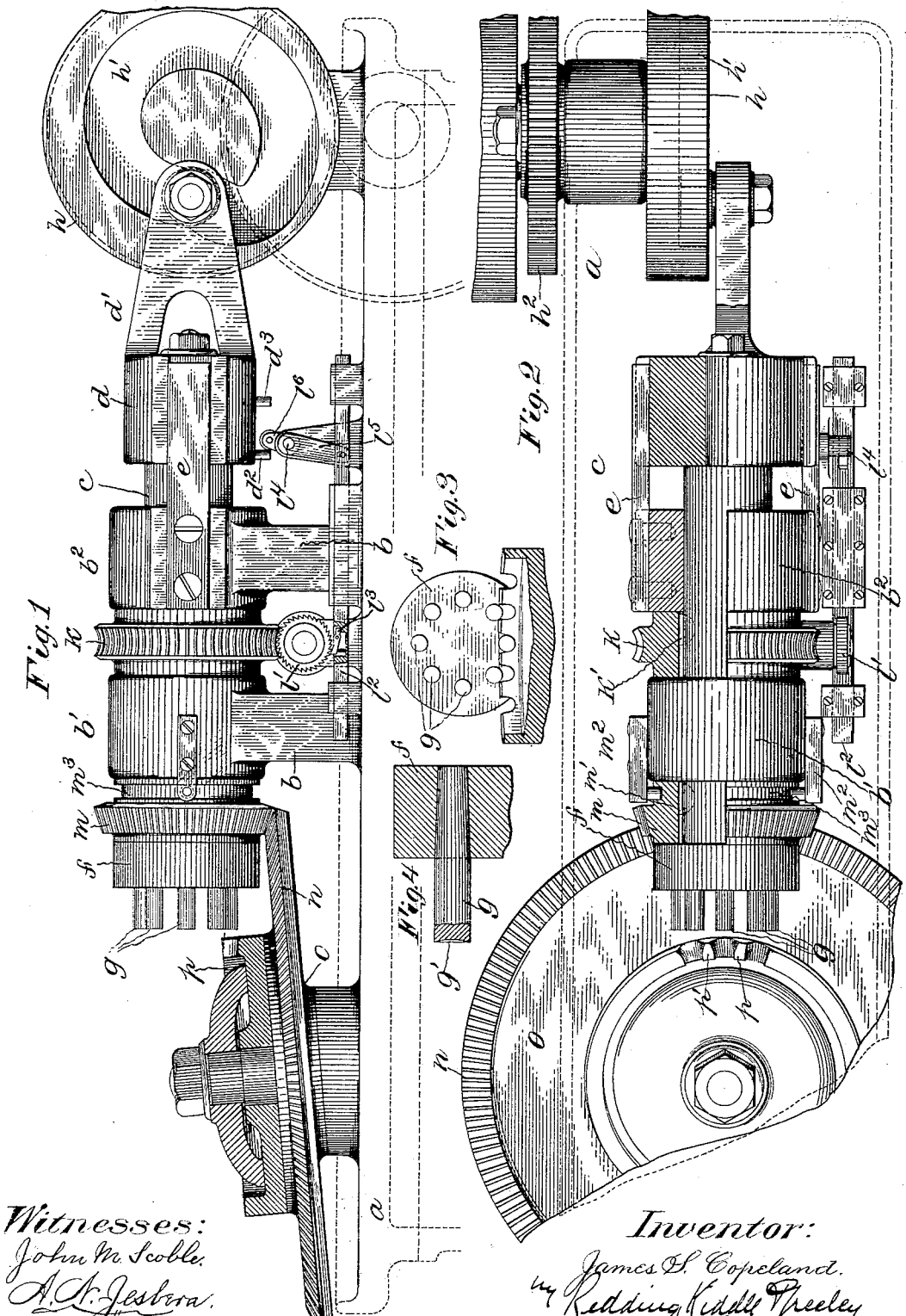
Witnesses:
John M. Scoble
A. S. Jestira
Inventor:
James S. Copeland
by Redding Kiddle Greeley
Attys

UNITED STATES PATENT OFFICE.

JAMES S. COPELAND, OF HARTFORD, CONNECTICUT, ASSIGNOR TO THE AMERICAN BICYCLE COMPANY, OF JERSEY CITY, NEW JERSEY.

GEAR-CUTTING MACHINE.

SPECIFICATION forming part of Letters Patent No. 638,562, dated December 5, 1899.

Application filed April 12, 1899. Serial No. 712,690. (No model.)

*To all whom it may concern:*

Be it known that I, JAMES S. COPELAND, a citizen of the United States, and a resident of Hartford, in the county of Hartford and State of Connecticut, have invented certain new and useful Improvements in Gear-Cutting Machines, of which the following is a full, clear, and exact description, whereby any one skilled in the art can make and use the same.

My invention relates to the class of machines having the operative parts so arranged as to produce by the operation of the machine a gear the teeth of which are so formed as to insure practically a line-contact of interengaging teeth on corresponding gears; and the object of my invention is to provide a machine of this class that shall accurately form the teeth of a gear adapted to engage with a line-contact the teeth of a so-called "pin-wheel" gear.

To this end my invention consists in the combination of the several parts making up the machine as a whole and in the details of such parts and their combination, as hereinafter described, and more particularly pointed out in the claims.

Referring to the drawings, Figure 1 is a detail view, in side elevation, of the operative parts of the machine. Fig. 2 is a detail plan view of the machine with parts broken away to show construction. Fig. 3 is a view in front elevation of the cutter-head and a view of a piece of a blank, showing the relative arrangement of the parts in the operation of cutting. Fig. 4 is a detail view, on enlarged scale, showing the cutter-head with one plug-cutter in its socket, the end of the cutter being broken away in section to show construction.

In the accompanying drawings the letter $a$ denotes the base or frame of the machine, which is indicated in dotted outline, and $b$ a bracket or standard in which the main working shaft $c$ is supported in bearings $b'$ $b^2$, of ordinary construction. A cross-head $d$ is secured to the rear end of the shaft $c$ and has a reciprocating movement on slideways $e$, which may be formed of separate parts secured, as by means of bolts, to the opposite sides of the standard $b$ and which extend parallel to each other and rearward from the standard. On the front end of the shaft is secured a cutter-head $f$, which is provided with a plural number of cutters $g$, secured in sockets in the head, as by means of a tapered shank fitting a tapered socket in the cutter-head. These cutters project from the face of the cutter-head and are arranged equidistant about the center of the axis, so as to occupy the same relative position as a series of pins in the pin or lantern gear which engages the teeth of a gear as cut by the machine.

The cutting face of each cutter $g$ has a recess $g'$ in order to provide the proper cutting edge.

The main shaft has a reciprocating movement, which is imparted to it, preferably, by means of the box-cam $h'$, formed in the face of the disk $h$, which engages a pin borne on the rear end of the shaft or a bracket projection $d'$ from the cross-head $d$, the pin having an antifriction-roller held in operative contact with the cam. The cam-shaft is driven from any suitable source of power, as by means of interengaging gear-wheels, of which the gear $h^2$ is the one fast to the cam-shaft.

On the main shaft $c$ a worm-gear $k$ is mounted, preferably between the bearings $b'$ $b^2$, which hold it from lengthwise movement with the shaft, and it is attached to the shaft, as by means of a key $k'$, of ordinary construction, which permits a lengthwise movement of the shaft without carrying with it the gear. Transversely of the shaft and preferably on the frame of the machine a rotary worm is mounted in position to engage the worm-gear $k$, and this worm is provided with ratchet mechanism, the ratchet-wheel $l'$ of which overlies a sliding member $l^2$, supported on the bed $a$ and bearing a spring-pawl $l^3$. The feed-slide $l^2$ is moved by means of a rocker-shaft $l^4$, having a crank-arm $l^5$, engaging the slide, and another crank-arm $l^6$, provided with an antifriction-roller and located in the path of movement of the pins $d^2$ $d^3$, which project from the under surface of the cross-head $d$. The reciprocating movement of the cross-head causes a pin $d^2$ to tilt the rock-shaft in one direction, and this moves the slide $l^2$ so that the pawl $l^3$, engaging the teeth of the ratchet-wheel $l'$, causes the worm-shaft to which the ratchet-wheel is secured to rotate to a degree depending upon the relative adjustment of the parts. A reverse movement of the cross-head causes the slide to move in an opposite direction by the action of the pin $d^3$, and the pawl engages with another tooth of the ratchet in readiness for a succeeding feeding movement of the slide.

Near the front end of the main shaft $c$ a gear-wheel $m$ is mounted on the shaft $c$ and attached to it by means of a key $m'$. The gear-wheel $m$ is held against lengthwise movement with the shaft by means of the clamps $m^2$, fast to the standard $b$ and having pins projecting into a peripheral groove $m^3$ in the hub of the gear. The gear $m$ turns, however, with the shaft in its intermittent rotary movement and drives the gear $n$, which is on the rotary table $o$. This table $o$ is rotarily mounted on the bed of the machine and turns in a plane at an angle with the axis of the shaft $c$. A gear-blank $p$ is clamped to the table $o$ by any convenient form of clamping device and firmly held with the flange of the blank in the path of movement of one or more of the cutters $g$. The teeth of this blank are preferably roughened out by any suitable means and are finished as to their working faces in the within-described machine.

In the cutting operation the shaft $c$ is moved forward in a straight line, so as to carry the cutters across the path of movement of a tooth $p$ on the blank and at an angle with the axis of the blank, a cutter making in the blank a groove corresponding to the shape of that part of the cylindrical cutter in contact with the blank. As the shaft is moved backward and the cutters withdrawn both the blank and cutter-carrier are rotated and the cutting operation again repeated. This repeated cutting operation and simultaneous rotary movement of the blank and cutter-carrier at a uniform speed of constant ratio, simulating the movement of the teeth of intermeshing gears in operation, forms the contact-surface of a tooth on the blank in proper position and of desired shape to maintain a line contact with a pin of which the cutter may be said to be a counterpart.

While there has been shown and described herein a carrier bearing a number of cutters revolving about the axis of the carrier, it is obvious that this same result of movement of a cutter in a circular path may be obtained by various mechanisms and that any number of cutters may be employed, and any means for accomplishing this circular movement of a cutter in the combination recited will come within the scope of my invention.

I claim as my invention—

1. In a machine for cutting angle-gears, a blank-holder rotatable about an axis arranged at an angle with the axis of a cutter-carrier, the cutter-carrier, a cutter on said carrier reciprocally movable in a direction longitudinally of the axis of the carrier and at an angle with the axis of the blank-holder, said cutter having a cutting edge representing in shape a transverse section of the operative surface of a pin of a lantern-gear adapted to mesh with the teeth of the gear to be cut by said cutter.

2. In a machine for cutting angle-gears, a blank-holder rotatable about an axis intersecting the axis of a cutter-carrier, the cutter-carrier, a cutter on said carrier reciprocally movable in a direction longitudinally of the axis of the cutter-carrier and at an angle with the axis of the blank-holder, said cutter having a cutting edge representing in shape a transverse section of the operative surface of a pin of a lantern-gear adapted to mesh with the teeth of a gear to be cut by said cutter, said cutting edge coinciding in position, with respect to the axis of the carrier, with the position of the operative surface of a pin of a lantern-gear, with respect to its axis, adapted to mesh with the gear to be cut by said cutter.

3. In a machine for cutting angle-gears, a blank-holder rotatable about an axis intersecting the axis of a cutter-carrier, the cutter-carrier, a cutter on said carrier reciprocally movable in a direction longitudinally of the axis of the cutter-carrier and at an angle with the axis of the blank-holder, said cutter having a cutting edge representing in shape a transverse section of the operative surface of a pin of a lantern-gear adapted to mesh with the teeth of a gear to be cut by said cutter, and means for simultaneously rotating the blank and cutter-carrier at a speed ratio equal to that of the corresponding finished gears.

4. In a machine for cutting angle-gears, a rotatable blank-holder, a bevel-gear connected therewith, a rotatable cutter-carrier, a bevel-gear connected with said carrier and in mesh with the first-named gear, a cutter on said cutter-carrier reciprocally movable in a direction longitudinally of the axis of the carrier and at an angle with the axis of the blank-holder, said cutter having a cutting edge representing in shape a transverse section of the operative surface of a tooth of a gear adapted to mesh with the teeth of the gear to be cut by said cutter, and means for simultaneously rotating the blank-holder and cutter-carrier intermittently at a speed ratio equal to that of the corresponding finished gears and at a time when the cutter is disengaged from the blank.

5. In a machine for cutting angle-gears, a blank-holder rotatable about an axis intersecting the axis of a cutter-carrier, the cutter-carrier, a cutter on said carrier reciprocally movable in a direction longitudinally of the axis of the cutter-carrier and at an angle with the axis of the blank-holder, said cutter having a cutting edge representing in shape a transverse section of the operative surface of a pin of a lantern-gear adapted to mesh with the teeth of a gear to be cut by said cutter, and means for simultaneously rotating the blank-holder and cutter-carrier intermittently at a speed ratio equal to that of the corresponding finished gears and at a time when the cutter is disengaged from the blank and by a part effecting the reciprocation of the cutter.

6. In a machine for cutting angle-gears, a blank-holder rotatable about an axis intersecting the axis of a cutter-carrier, a bevel-gear connected therewith, the cutter-carrier, a bevel-gear connected with said carrier and in mesh with the first-named gear, a cutter on said carrier reciprocally movable, said cutter having a cutting edge representing in shape a transverse section of the operative surface of a tooth of a gear adapted to mesh with the teeth of a gear to be cut by said cutter, and means for simultaneously rotating the blank-holder and cutter-carrier intermittently at a speed ratio equal to that of the corresponding finished gears and by the reciprocation of the cutter-head when the cutter is clear of the blank.

7. In a machine for cutting angle-gears, a blank-holder rotatable about an axis and arranged at an angle to the axis of a cutter-carrier, a bevel-gear connected therewith, the cutter-carrier, a bevel-gear connected with said carrier and in mesh with the first-named gear, a plurality of cutters mounted on the carrier with their cutting edges corresponding in shape to transverse sections through the working surfaces of the teeth of a gear adapted to mesh with the gear to be cut by said cutter, and said cutting edges having relative positions, with respect to the axis of the carrier, coinciding with the relative positions, with respect to the axis of the gear, of transverse sections through the operative surfaces of the teeth of such a gear adapted to mesh with the teeth of the gear to be cut by said cutter.

JAMES S. COPELAND.

Witnesses:
   FELTON PARKER,
   HERMANN F. CUNTZ.